United States Patent [19]

Takei et al.

[11] Patent Number: 5,368,940
[45] Date of Patent: Nov. 29, 1994

[54] CARBON COMPOSITE MATERIAL REINFORCED WITH CARBON FIBER AND INORGANIC FIBER

[75] Inventors: Makoto Takei, Nishinomiya; Isao Kinugawa, Osaka; Mamoru Tamura, Hirakata; Seiichi Tashiro, Osaka, all of Japan

[73] Assignee: Ohwada Carbon Industrial Co., Ltd., Osaka, Japan

[21] Appl. No.: 124,358

[22] Filed: Sep. 20, 1993

Related U.S. Application Data

[63] Continuation of Ser. No. 837,219, Feb. 18, 1992, abandoned.

[30] Foreign Application Priority Data

Mar. 6, 1991 [JP] Japan .................... 3-038835
Aug. 6, 1991 [JP] Japan .................... 3-195603

[51] Int. Cl.$^5$ .................... B32B 9/00; B32B 31/00
[52] U.S. Cl. .................... 428/408; 428/366; 428/367; 428/446; 428/450; 428/688; 428/689; 428/697; 428/698; 428/704; 428/902; 427/228; 427/299; 427/402

[58] Field of Search .................... 428/408, 366, 367, 446, 428/450, 688, 689, 697, 698, 699, 704, 902; 427/228, 299, 402

[56] References Cited

U.S. PATENT DOCUMENTS

| | | |
|---|---|---|
| 4,795,677 | 3/1989 | Gray .................... 428/246 |
| 4,894,286 | 1/1990 | Gray .................... 428/408 |
| 5,094,901 | 3/1992 | Gray . | |

Primary Examiner—Patrick J. Ryan
Assistant Examiner—Richard C. Weisberger
Attorney, Agent, or Firm—Joseph W. Farley

[57] ABSTRACT

A carbon composite material reinforced with a carbon fiber and an inorganic fiber. The composite material has a core formed of a carbon fiber-reinforced carbon composite comprising a carbon fiber reinforcement and a carbon matrix, The core is externally covered with an inorganic fiber-reinforced carbon composite comprising an inorganic fiber reinforcement, other than carbon, and a matrix composed either of carbon alone or a mixture of carbon and boride. This provides for sound and steady protection against oxidation, as well as for retention of high strength in an oxidizing atmosphere at high temperatures.

4 Claims, 1 Drawing Sheet

CARBON COMPOSITE MATERIAL REINFORCED WITH CARBON FIBER AND INORGANIC FIBER

This is a continuation of copending application Ser. No. 07/837,219 filed on Feb. 18, 1992, now abandoned.

FIELD OF THE INVENTION

The present invention relates to a carbon composite material reinforced with both a carbon fiber and an inorganic fiber.

BACKGROUND OF THE INVENTION

A carbon fiber-reinforced carbon composite (hereinafter referred to as "C/C composite") is a very light material such that its specific gravity is as low as 1.5–1.7 and can retain high strength of the order of more than 1,000 kg f/cm$^2$ at high temperatures of more than 1,500° C. It is expected, therefore, that use of such composite will steadily grow in various high technology applications.

In space navigation, for example, it is well anticipated that a space shuttle will be exposed to considerable pressre under high temperature conditions of more than 1,700° C. when it dives at superhigh speed from the outer space into the atmosphere. For use under such demanding conditions, C/C composites are most highly recommended. However, C/C composites are comprised of carbon material only and will be oxidized and consumed at temperatures of more than 400° C., in an oxidizing atmosphere as in the air. As such, areas of their applicability are limited.

In order to improve the oxidation resistance of C/C composites, attempts have been made to cover the C/C composite with SiC by chemical vapor deposition (CVD). However, because of the fact that the linear expansion coefficient of SiC is widely different from that of C/C composite, the former being $4.5 \times 10^{-6}$ whereas the latter is $1.5 \times 10^{-6}$, even if SiC is uniformly deposited on the C/C composite by CVD at about 1,500° C., fine cracks will develop when the temperature is lowered to room temperature, with the result that the carbon goes in contact with air through the cracks to become oxidized. In order to prevent the occurrence of such trouble, the C/C composite may be first covered with $B_2O_3$ or TiC and then with SiC so that the resulting composite material has stepwise varied linear expansion coefficients, it being thus possible to prevent cracking due to temperature changes. However, this method is yet unsatisfactory to solve the problem and, in addition, it requires a complicated and costly process for fabrication. Further, an oxidation resistant layer formed in such a way is disadvantageous in that it is of relatively low strength and is liable to cracking when considerable force and heat is applied to the surface of the compsite material as in the case where a space shuttle dives at superhigh speed into the atmosphere, so that oxidation occurs through the crack which will finally result in peeling off of the layer, considerable loss of strength of the C/C composite, and loss of its heat resisting properties.

SUMMARY OF THE INVENTION

The present invention is intended to solve these problems and it is an object of the invention to provide a composite material which has a sturdy and dependable oxidation-resistant layer and is capable of retaining high strength in a hot oxidizing atmosphere.

In order to accomplish this object, according to one aspect of the invention there is provided a carbon composite material reinforced with a carbon fiber and an inorganic fiber, comprising a core formed of a carbon fiber-reinforced carbon composite comprising a carbon fiber reinforcement and a carbon matrix, said core being externally covered with an inorganic fiber-reinforced carbon composite comprising an inorganic fiber reinforcement, other than carbon, and a carbon matrix.

According to another aspect of the invention, said carbon composite material further comprises an oxidation resistant material layer formed on the surface of the composite material and/or on the surface of internal pores thereof, said layer being of at least one kind of material selected from the group consisting of SiC, TiC, $B_4C$, WC, TaC, $Al_3C_4$, $Al_2O_3$, $Si_3N_4$, BN, $HfB_2$, AlN, $ZrB_2$, NbC, and ZrC.

The carbon fiber used in the invention may be any carbon fiber or any graphite fiber. Any one of different types of carbon fibers, such as acrylonitrile, rayon, pitch, lignin, and thermosetting resin types, may be used. Such carbon fiber is used in the form of filament, chopped strand, two-dimensional fabric, tridimensional fabric, or nonwoven fabric.

The inorganic fiber used in the invention may be a silicon carbide fiber ("NICALON" Nippon Carbon Company, Ltd., etc.), an alumina fiber ("Altex" Sumitomo Chemical Company, Ltd., etc.), a glass fiber (UNITIKA U. M. Glass Company, Ltd., etc.) or a boron fiber (Textron Specialty Materials Corp., etc.). It may also be a mixed fiber of silicon, carbon, titanium and oxygen ("Tyranno Fiber" UBE INDUSTRIES, LTD.), a mixed fiber of silicon, carbon and titanium, or a mixed fiber of silicon, carbon and oxygen (both by UBE INDUSTRIES LTD.). A mixed fiber of alumina and silicon oxide ("Ceramic Fibre" IBIDEN Company, Ltd.) may also be used as such. The glass fiber may be a mixture of silicon oxide, alumina and alkaline metallic oxide ("S. Glass" UNITIKA U. M. Glass Co., Ltd.), or a mixture of these with silicon oxide ("D. Glass" UNITIKA U. M. Glass Co., Ltd.), or of silicon oxide alone (Allied-Signal Inc.). A mixed fiber made of boron and tungsten, or a fiber made of boron alone may also be used. A fiber made of silicon nitride (Tomen Co., Ltd.) may also be used.

Such inorganic fibers are used in the form of long filament, chopped strand, two-dimensional fabric, tridimensional fabric, or nonwoven fabric. These fibers may also be used in combination for such fabrics as incorporating different fibers, for example a fabric made of a fiber of silicon carbide as warp and a fiber of alumina as woof. They may also be used for nonwoven fabircs incorporating different short fibers.

The foregoing composite material of the present invention is reinforced with a carbon fiber and an inorganic fiber, comprising a matrix of carbon. The carbon material of the matrix is a carbonized product of a thermosetting resin, such as phenolic resin, polyimide, or furan resin, or a carbonized product of a thermoplastic resin, such as pitch or nylon, or a carbonized product of a mixture of any such resin and at least one of the followings; carbon black, artificial graphite powder, natural graphite powder, and carbon powder. The matrix may either be of carbon or graphite, or a mixture of these.

Thus, the core component is made of a carbon composite material reinforced with a carbon fiber, and is sheathed with a composite material reinforced with an inorganic fiber. In order to improve the oxidation resistance of the composite material of the sheath component, its matrix is preferred to be made of the foregoing resin incorporated with boride. In the known art where boride is incorporated into resin forming the matrix of a composite material reinforced with a carbon fiber, only the oxidation resistance of the composite material of the sheath component is improved but the strength thereof is threatened to be lowered because the carbon fiber reinforcing the composite material is exposed to damage by the boride incorporated thereinto. The present invention, however, where an inorganic fiber is used in place of a carbon fiber enables it to maintain the strength as well as to improve the oxidation resistance of the composite material of the sheath component without causing the abovesaid problem.

To form an oxidation resistant material layer of the above described type on the surface of the carbon composite material formed in manner as above described and/or on the surface of internal pores of the composite material, techniques such as chemical vapor deposition (CVD), spattering, and vapor deposition may be employed, but it is especially preferred that the CVD technique, which can provide a densely formed layer capable of withstanding high temperatures, be employed.

Nextly, a method of fabricating such carbon composite material will be described. Initially, a fabric, preferably a two-dimensional fabric, made of a carbon fiber is impregnated with resin, preferably thermosetting resin, which is then molded into shape. For this purpose, where the fabric is a two-dimensional fabric, it is impregnated with, for example, phenolic resin and cut to the size of a die required for molding. Cut pieces of the fabric are stacked and set in the die, which are then molded into shape under such temperature and pressure conditions as are required for thermosetting, whereby a carbon fiber-reinforced resin composite is obtained.

A fabric, preferably a two-dimensional fabric, made of an inorganic fiber, is impregnated with resin, preferably a thermosetting resin, such as phenolic resin, whereby a prepreg is prepared. Improvement of the resistance to oxidation can be attained if a boron compound is mixed with the resin to such an extent that the weight ratio of the boron compound to be total weight of the prepreg is from 0.05 to 0.3. The previously formed carbon fiber-reinforced resin composite is wrapped with the prepreg, which is then set in a die and molded into shape under such temperature and pressure conditions as are needed for thermosetting, whereby a resin composite reinforced with carbon and inorganic fibers is obtained. The reinforced resin composite is calcined in an inactive atmosphere, such as nitrogen, argon, or carbon dioxide gas, at a temperature of more than 1,000 ° C., and the thus calcined composite is impregnated with pitch, thermosetting resin, or the like, which is then subjected to calcination. This process of impregnation and calcination is repeated to densify the composite. Thus, a carbon composite material according to the invention is obtained.

Further, over the surface of the composite material thus obtained is formed an oxidation resistant material comprised of at least one kind of material selected from the group consisting of SiC, TiC, $B_4C$, WC, TaC, $Al_3C_4$, $Al_2O_3$, $Si_3N_4$, BN, $HfB_2$, AlN, $ZrB_2$, NbC, and ZrC using known technique, such as CVD, spattering, or vapor deposition.

According to such construction, the inorganic fiber layer, other than carbon, formed of silicon carbide, alumina, glass, boron, or of a mixture consisting principally of any such substance provides greater resistance to oxidation and greater mechanical strength. Therefore, the C/C composite covered with such a fiber layer is securely protected by the layer which is not liable to breakage in an oxidizing atmosphere or upon exertion on its surface of any external force, so that the C/C composite is free from the possibility of being adversely affected by oxygen contact.

In case that an oxidizing atmosphere at high temperatures should prevail for a prolonged period of time, it may happen that the covering fiber layer may become unfavorably affected by oxidation via fine interstices of the fiber layer and, in addition, the matrix of the inorganic fiber layer which is carbon may become fractured, with the result that the inorganic fiber-reinforced carbon composite is lowered in strength and separated, the interior C/C composite being thus affected. This problem can be overcome by providing aforesaid oxidation resistant material layer formed on the surface of the carbon composite material and/or on the surface of internal pores thereof, the oxidation resistant material layer being of at least one kind of material selected from the group consisting of SiC, TiC, $B_4C$, WC, TaC, $Al_3C_4$, $Al_2O_3$, $Si_3N_4$, BN, $HfB_2$, AlN, $ZrB_2$, NbC, and ZrC. According to the CVD technique using SiC, for example, good consistency in linear expansion coefficient can be obtained when such covering layer is formed of an inorganic fiber made principally of Si; and therefore no cracking occurs even when there are upward and downward changes in temperature, the covering layer being thus able to retain high resistance to oxidation.

Moreover, the use of carbon incorporated with boride for the abovesaid matrix made of a carbon composite material reinforced with an inorganic fiber contributes to improve further the resistance to oxidation.

In this way, according to the invention, it is possible to provide a high-quality composite material having a covering layer not liable to fracture in an oxidizing atmosphere, the covering layer being formed of an inorganic fiber having high mechanical strength and being unlikely fractured even when external force is applied on its surface. In particular, by providing an oxidation resistant material layer formed over the surface of the composite material and over the surface of internal pores thereof, it is possible to allow the composite material to maintain good and stable resistance to oxidation.

DESCRIPTION OF THE PREFERRED EMBODIMENTS

Figure 1:
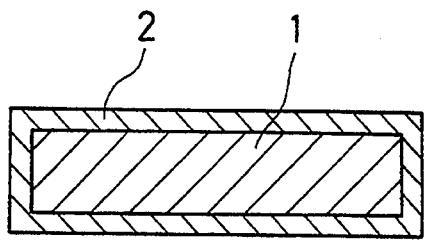
FIG. 1 is a sectional view showing a carbon composite material reinforced with both a carbon fiber and an inorganic fiber which represents one embodiment of the invention.

The invention will be further described with reference to the accompanying drawings. In FIG. 1, numeral 1 designates a carbon fiber-reinforced carbon composite, and numeral 2 designates an inorganic fiber-reinforced carbon composite in which the carbon composite 1 is completely covered.

Figure 2:
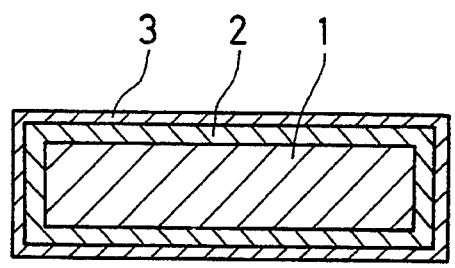
FIG. 2 is a sectional view showing a carbon composite material reinforced with both a carbon fiber and an inorganic fiber which represents another embodiment of the invention.

In FIG. 2 there is shown a carbon composite material reinforced with both a carbon fiber and an inorganic fiber, wherein an oxidation resistant material layer 3 made of at least one kind of material selected from the group consisting of SiC, TiC, $B_4C$, WC, TaC, $Al_3C_4$, $Al_2O_3$, $Si_3N_4$, BN, $HfB_2$, AlN, $ZrB_2$, NbC, and ZrC is formed over the surface of the inorganic fiber-reinforced carbon composite 2 in FIG. 1 and/or over the surface of internal pores thereof.

The following examples are given to further illustrate the invention.

EXAMPLE 1

A fabric made of 6,000 filaments of an acrylic carbon fiber (produced by Toray Industries, Inc.) and having 420 ends/m, 420 fillings/m, and a weight of 330 gr/$m^2$ was immersed in a mixed resin solution in which one part of a phenolic resin (produced by Unitika, Ltd.; "UNIVEX S", registered trademark) was dissolved in one part of acetone, whereby a prepreg was prepared such that the ratio of the weight of the fabric to the weight of the resin as measured when the acetone was evaporated was 1:1. The prepreg was placed in a die and compressed by a 200-ton hot press under the pressure of 150 kg/$cm^2$. Then, a fabric having 420 ends/m, 420 fillings/m, and a weight of 420 g/$m^2$ which was woven from 1,600 filaments of an inorganic fiber composed of Si, 50%; C, 25%; O, 20%; Ti, 5% ("Tirano" fiber, produced by Ube Industries, Ltd.) was immersed in a mixed resin solution in which one part of phenolic resin was dissolved in one part of acetone, whereby a prepreg was prepared such that the weight ratio of the fabric to the resin was 1:1. Tension was applied to this prepreg so that the previously made prepreg of the carbon fiber fabric was completely wrapped by it. The resulting material was set in a die and was subjected to curing reaction under the pressure of 150 kg/$cm^2$ and at a temperature of 200° C.

The resin composite reinforced with carbon and inorganic fibers, thus obtained, was calcined in vacuum at 1,300° C., which was then impregnated with a mixed resin solution of phenolic resin and acetone and again calcined. This process of impregnation and calcination was repeated five times and thus a carbon composite material reinforced with carbon and inorganic fibers was obtained. An oxidizing test was conducted by subjecting the carbon fiber-inorganic fiber reinforced carbon composite material to 24-hr drying in the air at 100° C., then weighing same. Thereafter, the composite material was allowed to stand in the air at 500° C. for 100 hrs and weighed. A 7% loss in weight was observed.

EXAMPLE 2

A carbon fiber-inorganic fiber reinforced carbon composite material made in exactly same way as in Example 1 was covered with SiC according to the CVD technique. In same way as the Example 1 procedure, the resulting product was dried in the air at 100° C. for 24 hrs, then weighed, and thereafter same was allowed to stand in the air at 500° C. for 100 hrs and weighed. No loss in weight was noticed.

Comparative Example 1

A prepreg of a carbon fiber fabric was prepared. The prepreg was placed in a die and was subjected to curing reaction by a 200-ton hot press under a pressure of 150 kg/$cm^2$ and in a 200° C. atmosphere.

The resulting carbon fiber-reinforced resin composite was calcined in vacuum at 1,300° C., which was then impregnated with a mixed resin solution of phenolic resin and acetone. This process of impregnation and calcination was repeated five times, whereby a carbon fiber-reinforced carbon composite was made. An oxidizing test was conducted with this carbon fiber-reinforced carbon composite in same way as in Example 1. As a result, a 30% loss in weight was noticed.

EXAMPLE 3

A fabric made of 6,000 filaments of an acrylic carbon fiber (produced by Toray Industries, Inc.) and having 420 ends/m, 420 fillings/m, and a weight of 330 gr/$m^2$ was immersed in a mixed resin solution in which one part of a phenolic resin (produced by Unitika, Ltd.; "UNIVEX S") was dissolved in one part of acetone, whereby a first prepreg was prepared such that the ratio of the weight of the fabric to the weight of the resin as measured when the acetone was evaporated was 1:1. The first prepreg was placed in a die and compressed by a 200-ton hot press under the pressure of 150 kg/$cm^2$. Then, a fabric having 420 ends/m, 420 fillings/m, and a weight of 420 g/$m^2$ which was woven from 1,600 filaments of an inorganic fiber composed of Si, 50%; C, 25%; O, 20%; Ti, 5% ("Tirano" fiber, produced by Ube Industries, Ltd.) was immersed in a mixed resin solution in which one part of phenolic resin was dissolved in one part of acetone, whereby a second prepreg was prepared such that the weight ratio of the fabric to the resin was 1:1. Tension was applied to this second prepreg so that the first prepreg of the carbon fiber fabric was completely wrapped by it. The resulting material was set in a die and was subjected to curing reaction under the pressure of 150 kg/$cm^2$ and at a temperature of 200° C.

The resin composite material reinforced with carbon and inorganic fibers, thus obtained, was calcined in vacuum at 1,300° C., which was then impregnated with a mixed resin solution of phenolic resin and acetone, and again calcined. This process of impregnation and calcination was repeated five times, whereby a carbon composite material reinforced with carbon and inorganic fibers was obtained. This carbon fiber-inorganic fiber-reinforced carbon composite material was covered with $Si_3N_4$ by the CVD technique. An oxidizing test was carried out by drying the so covered composite material in the air at 100° C. for 24 hrs, then weighing same. Subsequently, the composite material was allowed to stand in the air at 500° C. for 100 hrs and then weighed. No loss in weight was noticed.

EXAMPLE 4

A fabric made of 6,000 filaments of an acrylic carbon fiber (produced by Toray Industries, Inc.) and having 420 ends/m, 420 fillings/m, and a weight of 330 gr/$m^2$ was immersed in a mixed resin solution in which one part of a phenolic resin (produced by Unitika, Ltd.; "UNIVEX S") was dissolved in one part of acetone, whereby a first prepreg was prepared such that the ratio of the weight of the fabric to the weight of the resin as measured when the acetone was evaporated was 1:1. The first prepreg was placed in a die and compressed by a 200-ton hot press under the pressure of 150 kg/$cm^2$. Then, a fabric having 420 ends/m, 420 fillings/m, and weight of 420 g/$m^2$ which was woven from 1,600 filaments of an inorganic fiber composed of Si, 50%; C, 25%; O, 20%; Ti, 5% ("Tirano" fiber, produced by Ube Industries, Ltd.) was immersed in a mixed resin solution in which phenolic resin of 45% wt, borosilicate glass (made of $SiO_2$ of 30% wt, $B_2O_3$ of 30% wt and alkaline metallic oxide of 40% wt) of 10% wt and acetone of 45% wt are dissolved, whereby a second prepreg was prepared such that the weight ratio of the fabric to the resin was 1:1. Tension was applied to this second prepreg so that the first prepreg of the carbon fiber fabric was completely wrapped by it. The resulting material was set in a die and was subjected to curing reaction under the pressure of 150 kg/cm² and at a temperature of 200° C..

The resin composite material reinforced with carbon and inorganic fibers, thus obtained, was calcined in vacuum at 1,300° C., which was then impregnated with a mixed resin solution of phenolic resin and acetone, and again calcined. This process of impregnation and calcination was repeated five times, whereby a carbon composite material reinforced with carbon and inorganic fibers was obtained. This carbon fiber-inorganic fiber-reinforced carbon composite material was covered with $Si_3N_4$ by the CVD technique. An oxidizing test was carried out by drying the so covered composite material in the air at 100° C. for 24 hrs, then weighing same. Subsequently, the composite material was allowed to stand in the air at 500° C. for 100 hrs and then weighed. No loss in weight was noticed.

What is claimed is:

1. A carbon composite material reinforced with a carbon fiber and an inorganic fiber, comprising a core formed of a carbon fiber-reinforced carbon composite comprising a carbon fiber reinforcement and a carbon matrix which does not contain a boron compound, said core being externally covered with an inorganic fiber-reinforced carbon composite comprising an inorganic fiber reinforcement, other than carbon, and a carbon matrix.

2. A carbon composite material reinforced with a carbon fiber and an inorganic fiber as set forth in claim 1, further comprising an oxidation resistant material layer formed on the surface of said composite material and/or on the surface of internal pores thereof, said layer being of at least one kind of material selected from the group consisting of SiC, TiC, $B_4C$, WC, TaC, $Al_3C_4$, $Al_2O_3$, $Si_3N_4$, BN, $HfB_2$, AlN, $ZrB_2$, NbC, and ZrC.

3. A carbon composite material reinforced with a carbon fiber and an inorganic fiber, comprising a core formed of a carbon fiber-reinforced carbon composite comprising a carbon fiber reinforcement and a carbon matrix which does not contain a boron compound, said core being externally covered with an inorganic fiber-reinforced carbon composite comprising an inorganic fiber reinforcement, other than carbon, and a matrix of a mixture of carbon and boride.

4. A carbon composite material reinforced with a carbon fiber and an inorganic fiber as set forth in claim 3, further comprising an oxidation resistant material layer formed on the surface of said composite material and/or on the surface of internal pores thereof, said layer being of at least one kind of material selected from the group consisting of SiC, TiC, $B_4C$, WC, TaC, $Al_3C_4$, $Al_2O_3$, $Si_3N_4$, BN, $HfB_2$, AlN, $ZrB_2$, NbC, and ZrC.

* * * * *